3,062,868
3-T-AMYL-6-BROMOPHENYL N-METHYL-CARBAMATE

Joseph E. Moore, Pinole, Joseph N. Ospenson, Concord, and Gustave K. Kohn, Berkeley, Calif., assignors to California Research Corporation, San Francisco, Calif., a corporation of Delaware
No Drawing. Filed Sept. 21, 1959, Ser. No. 841,037
1 Claim. (Cl. 260—479)

This invention relates to a new compound, namely, 3-t-amyl-6-bromophenyl N-methylcarbamate and its use as a cholinesterase inhibitor in agricultural pesticide formulations.

One of the ultimate criteria relating to the effectiveness of certain agricultural pesticides which function as digestive and/or contact toxicants is their ability to inhibit the cholinesterase enzyme system of the animal parasite. This type of functional activity is primarily responsible for the effectiveness of at least two of the recognized classes of synthetic organic pesticides; namely, the phosphates and carbamates. Recently, the pesticidal effectiveness of certain carbamic acid esters has been recognized, and efforts have been directed to the synthesis and development of specific carbamate esters of increased cholinergic activity.

There has now been discovered a unique compound, namely, 3-t-amyl-6-bromophenyl N-methylcarbamate, whose anti-cholinesterase activity is markedly superior to one of its homologs which is recognized as one of the most active carbamate esters previously known. In fact, the cholinergic activity of the invention compound is of the order of twice as great as the activity of its homolog; namely, m-t-butylphenyl N-methylcarbamate. This outstanding activity as a cholinesterase inhibitor accentuates its effectiveness as an agricultural pesticide and particularly its application as a digestive and/or contact toxicant for the purpose of inhibiting the cholinesterase function in the cold-blooded animal parasites such as insects, mites, nematodes, arachnids, etc.

The invention compound 3-t-amyl-6-bromophenyl N-methylcarbamate, which is definitive of the following structural formula,

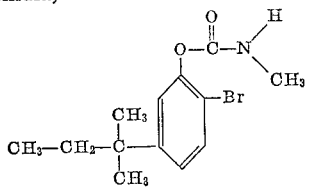

may be prepared (1) by reacting 3-t-amyl-6-bromophenol with methylisocyanate or (2) by reacting 3-t-amyl-6-bromophenol or the corresponding metal phenate with phosgene followed by reaction of the resulting intermediate chloroformate with methylamine.

Of particular significance to the production of the subject cholinesterase inhibitor is the particularity of the alkylphenol reactant and its effect on the final carbamate ester composition. Both the meta positioning of the t-amyl radical and ortho positioning of the bromine have been found essential to achieve the unique cholingeric activity of the resulting carbamate ester.

A number of conventional synthesis methods may be employed in the preparation of the 3-t-amyl-6-bromophenol reactant. For the purpose of preparing the desired phenol of substantial isomeric purity, one method involves the t-amylation of bromobenzene followed by nitration, reduction, diazotization and hydrolysis of the diazonium salt to produce the 3-t-amyl-6-bromophenol. Another more simplified method involves the controlled bromination of m-t-amylphenol.

The following examples are illustrative of the preparation of the invention compound.

EXAMPLE I

*Preparation of 3-t-Amyl-6-Bromophenol*

471 grams of bromobenzene were added to a three-neck flask equipped with a condenser, stirrer, thermometer, and cooling bath. The temperature was reduced to 0 to 5° C. and 9.0 grams anhydrous $AlCl_3$ were added and stirred for 30 minutes. Then 319.5 grams of t-amylchloride were slowly added over a period of 1½ hours at 0 to 5° C. After all had been added, the agitation was continued for an additional hour, then quenched in ice water, phase separated, neutralized and dried. Distillation gave 476 grams (70%) of p-t-amyl bromobenzene. IR anaylsis confirmed the high p-isomer content of this material.

This material was nitrated in the following manner. 471 grams of the t-amyl bromobenzene were added as rapidly as possible at 20° C. to a mixture of 308 grams $HNO_3$ (70%) and 617 grams $H_2SO_4$ (96%) with good agitation. After all was added, an additional 100 grams of $H_2SO_4$ were added and then the mixture was allowed to stand overnight. The organic phase was separated, neutralized and dried. 508 grams of crude material were obtained.

The reduction was accomplished by preparing a mixture of 110 mil. water, 274 grams iron, 6.6 grams NaCl and 11 ml. HCl with very high agitation and then adding 500 grams of p-t-amyl nitrobromobenzene at a moderate rate at a temperature of 100° C. The heating and stirring was continued for 16 hours after the addition was complete.

The resultant mixture was filtered and then phase separated. The organic phase was dried and used directly in the next step.

272.5 grams of the crude aniline derivative were mixed with 564 ml. $H_2O$ and 200 ml. $H_2SO_4$ with good agitation and cooling. The temperature was brought to 0° C. at which time a solution of 90.5 grams $NaNO_2$ in 246 ml. of water was added dropwise. When all was added, 842 ml. of additional water was added and the solution stirred at 0° for two hours.

A separate flask was set up in such a way as to permit steam distillation. A total of 562 ml. $H_2O$ and 748 ml. concentrated $H_2SO_4$ was placed in the flask and heated to reflux. The diazonium salt soultion was then added to this mixture at the same rate as distillate was removed. The phenol was separated from the steam distillate and a total of 174 grams (64% yield) of 3-t-amyl-6-bromophenol was obtained.

EXAMPLE II

*Preparation of 3-t-Amyl-6-Bromophenyl N-Methylcarbamate*

24 grams of the crude 3-t-amyl-6-bromophenol prepared in accordance with Example I and 5.7 grams of methylisocyanate were sealed in a tube and heated at 100° C. for four days. The resultant oil was stripped to 110° C. at 0.1 mm. Hg. Analysis showed N=4.4% (theory 4.6%) and Br=24.3% (theory 26.6%).

In the application of the subject compound as a cholinesterase inhibitor, considerable variation in its formulation may be employed. Thus 3-t-amyl-6-bromophenyl N-methylcarbamate may be applied per se or in combination with other active ingredients in both solid or liquid pesticidal formulations. As an example, 3-t-amyl-6-bromophenyl N-methylcarbamate may be formulated into a wettable powder by incorporating it with appropriate quantities of a solid insert carrier, such as talc, limestone, bentonite, diatomaceous earth, etc., and suitable wetting and emulsifying agents, such as the anionic and/or the nonionic surfactants. This mixture is thoroughly mixed and ground to a suitable particle size. For liquid formulations, the subject compound may be dissolved in hydrocarbon solvents or polar solvents or combinations thereof, depending upon the concentration desired, to which a minor quantity of a nonionic or anionic surfactant is added to provide emulsifying and wetting properties. Such liquid concentrates and wettable powders permit easy dispersion in water to practical field dilutions.

The outstanding cholinergic activity of the invention compound is demonstrated by the following standardized test procedure. The activity of the enzyme acetylcholinesterase involves a reaction function with the substrate acetylcholine resulting in the formation of choline and acetic acid. In this test, the enzyme activity is determined by the amount of acetic acid liberated and is measured in terms of the change in pH in the presence of a standard buffer solution over a definite time period. The results are reported as the $I_{50}$ value which is defined as the quantity of inhibitor measured in micrograms per milliliter (gamma/ml.) which gives 50 percent inhibition.

For this test, acetylcholinesterase was obtained as a purified and stabilized enzyme from bovine erythrocytes; and the buffer employed contained 0.0367 moles sodium diethylbarbiturate, 1.20 moles potassium chloride, and 0.008 mole potassium dihydrogen phosphate per liter adjusted to a pH of 8.0. A stock solution of the candidate inhibitor containing 1 mg./ml. in methanol was prepared. Aliquots were then diluted with water to the test concentrations, which are usually between 0.01 and 10 gamma/ml. A series of concentrations are run concurrently. 1.0 ml. of the inhibitor solutions, adjusted to the test concentrations, is added to a 10 ml. beaker containing a magnetic flea. Simultaneously a stop watch is started and 2.0 ml. of a standard enzyme plus buffer solution are added. The contents are agitated thoroughly and placed in a bath maintained at 25.0° ± 0.1° C. After exactly 30 minutes, there is added 0.1 ml. of a standard acetyl choline bromide solution which had been allowed to come to the bath temperature. Following thorough agitation, the covered beaker is returned to the constant temperature bath. At exactly 90 minutes, the pH is measured on a Beckman Model G or equivalent pH meter.

The percent inhibition is then calculated from the pH values obtained for the blank, uninhibited enzyme, and the candidate inhibitor. A curve is then prepared by plotting on semi-logarithmic graph paper the concentration of the inhibitor in gamma/ml. on the log scale versus percent inhibition on the linear scale. The curve will be S-shaped. The concentration where the curve crosses the 50 percent inhibition mark is the $I_{50}$ value.

The superior cholinergic activity of cholinesterase inhibition of 3-t-amyl-6-bromophenyl N-methylcarbamate is attested by the following results in comparison with its homolog; namely, m - t - butylphenyl N - methylcarbamate.

| Compound: | $I_{50}$ |
|---|---|
| m-t-Butylphenyl N-methylcarbamate | 0.11 |
| 3-t-amyl-6-bromophenyl N-methylcarbamate | 0.07 |

Obviously, many modification and variations of the invention as hereinbefore set forth may be made without departing from the spirit and scope thereof, and therefore only such limitations should be imposed as are indicated in the appended claim.

We claim:
1. 3-t-amyl-6-bromophenyl N-methylcarbamate.

References Cited in the file of this patent

UNITED STATES PATENTS

| 2,208,485 | Aeschlimann | July 16, 1940 |
| 2,362,508 | Stevens | Nov. 14, 1944 |
| 2,677,698 | Deutschmann | May 4, 1954 |
| 2,776,197 | Gysin et al. | Jan. 1, 1957 |
| 2,843,519 | Fitch | July 15, 1958 |
| 2,854,374 | Huisman et al. | Sept. 30, 1958 |

OTHER REFERENCES

Kolbezen et al.: J. Ag. Food Chem., 2, 864 to 870 (1954).